No. 717,381. Patented Dec. 30, 1902.
T. FREGOSO.
CALCULATOR.
(Application filed July 25, 1902.)
(No Model.)
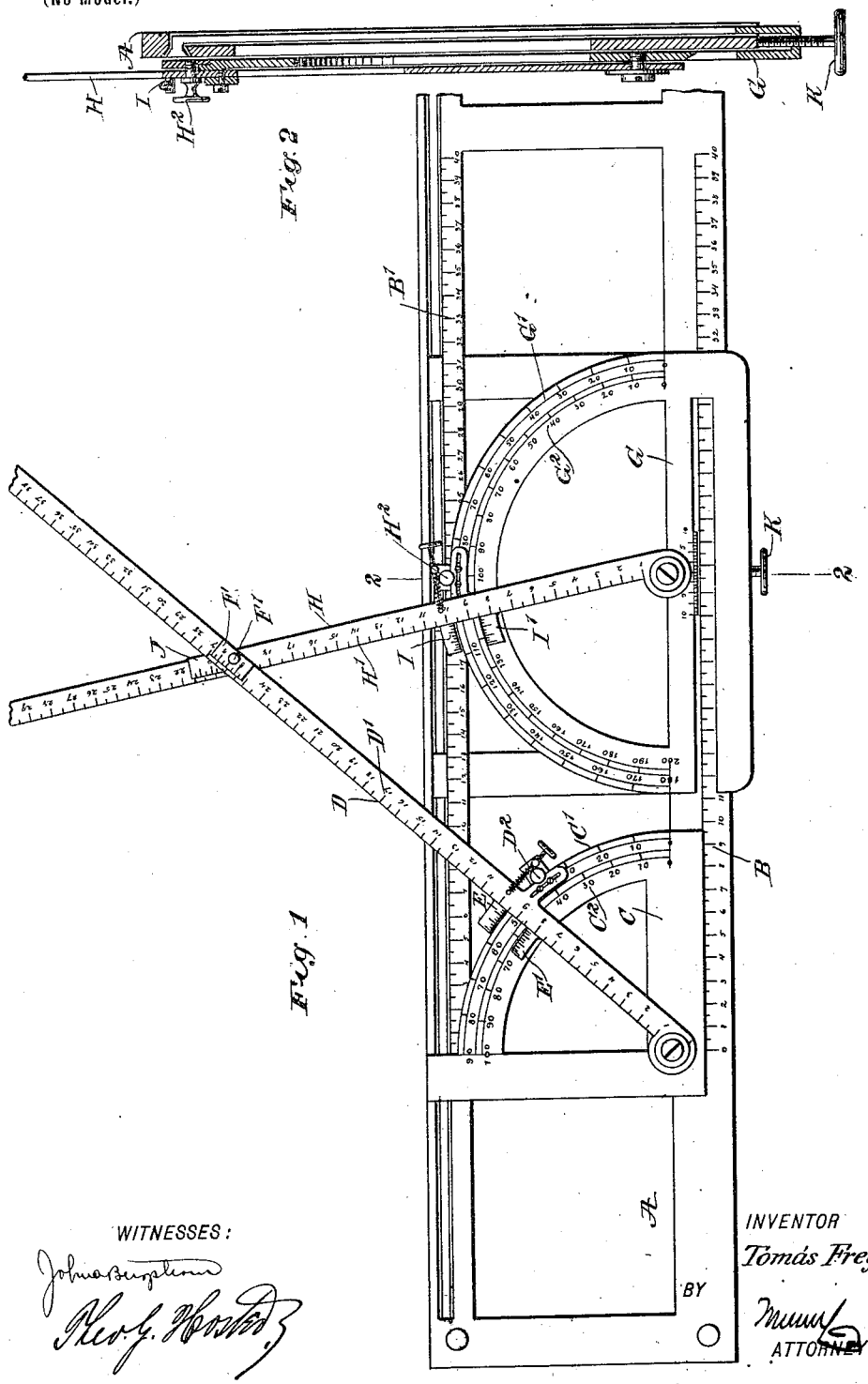
WITNESSES:
INVENTOR
Tomás Fregoso
BY
ATTORNEYS

UNITED STATES PATENT OFFICE.

TOMÁS FREGOSO, OF HERMOSILLO, MEXICO.

CALCULATOR.

SPECIFICATION forming part of Letters Patent No. 717,381, dated December 30, 1902.

Application filed July 25, 1902. Serial No. 116,942. (No model.)

*To all whom it may concern:*

Be it known that I, TOMÁS FREGOSO, a citizen of the Republic of Mexico, and a resident of Hermosillo, in the State of Sonora, Republic of Mexico, have invented a new and Improved Triangle-Measuring Instrument or Triangulometer, of which the following is a full, clear, and exact description.

The object of the invention is to provide a new and improved measuring instrument, more especially designed for surveyors and other persons and arranged to permit of readily and accurately finding without calculation rectangular coördinates to any distances with any angle in the sexagesimal or centesimal system, to solve right-angle triangles and oblique-angle triangles by giving immediately and accurately three required or unknown measurements, and when the other three measurements are known to reduce stadia distances to the horizon and to find the difference of elevation between any two points.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both views.

Figure 1 is a face view of the improvement, and Fig. 2 is an enlarged transverse section of the same on the line 2 2 of Fig. 1.

The rectangular frame A is provided on opposite sides with parallel lengthwise-extending graduations B B', representing millimeters and subdivisions, and on the said frame is secured a quadrant C, having graduations C' and C², of which the outside graduation C' is divided sexagesimally and the inner graduation C² is divided centesimally. The rule D for the quadrant C is provided with a graduation D' in millimeters and subdivisions thereof, and on the said rule are arranged verniers E E' for the graduations C' C², and on the said rule is slidably held a vernier F for reading one-twentieth of a millimeter on the graduation D'. A set-screw F' on the vernier F serves to fasten the same on the rule D, and a set-screw D² serves to fasten the rule D on the quadrant C. A semicircular protractor G is mounted to slide lengthwise on suitable guideways arranged on the frame A, and the said protractor G is provided with graduations G' G² similar to the graduations C' C² and on the protractor indicates a scale-bar H, having a graduation H' of millimeters, and on the said scale-bar are arranged verniers I I' for reading fractions on the protractor graduations G' G², respectively. A vernier J is slidable on the scale-bar H and is arranged for reading one-twentieth of a millimeter on the scale-bar graduation H'. A set-screw H² serves to fasten the scale-bar H in position on the protractor G. The latter is adapted to be moved lengthwise of the frame A by a rack-and-pinion movement K, as will be readily understood by reference to Fig. 2. The starting-point of distances or sides given to solve triangles is at zero of the graduation B. The starting-point in the quadrant C is given at zero of the graduations C' C², and the starting-point of the protractor G is at the left given at zero on both graduations G' G². The starting-points of the rule D and scale-bar H are at their pivots.

The instrument is used as follows: To find rectangular coördinates, the operator sets the rule D firmly at a given angle, the vernier F is fixed at a given distance, and the scale-bar H is fixed at right angles to the graduation B—that is, at ninety degrees on the graduation G'—and then the protractor G, with the scale-bar H, is moved lengthwise on the frame A along the graduation B until the zero of the vernier J touches the zero of the vernier F. The distance of the graduation B now gives the ordinate or latitude and the distance on the graduation H' of the scale-bar H indicates the departure or abscissa to the given distance and bearing. The reciprocal problem—that is, coördinates being given, to find the distance and angle—is easily solved by setting the latitude on the graduation B and the departure on the scale-bar H at right angles to each other. The rule D is now swung until the zero of its vernier F touches the zero of the vernier J, which marks the departure, and hence the problem is solved, because the angle sought for is marked on the quadrant by the verniers E E' and the distance is indicated by the linear vernier F.

In order to solve an oblique-angle triangle, the operator proceeds as follows: The scale-bar H is set at right angles to the graduation B and fastened in place on the protractor G by the set-screw H² and then the protractor and scale-bar are moved along the guideway on the frame A until the distance of the side known is reached on the graduation B. The protractor G is now fixed in place and the scale-bar H is swung on the protractor G to indicate one of the given angles. By similar means the other given angle is sought on the quadrant C by the rule D and then the intersecting point of the rule D and scale-bar H indicates the length of the other two sides, reading by the verniers F and J. The triangle is thus mechanically solved in all its six elements—namely, three sides and three angles—and without any calculation or danger of making mistakes. The examples above given only demonstrate the use of my instrument in plain trigonometry when the data is one side and two angles; but other cases may be accurately solved with the same ease and speed. The data can be set on the instrument at the time such data are obtained in the field; but it is evident that the instrument can be used as a plane-table, having the telescope over the rule D.

From the foregoing it will be seen that the instrument gives the value of all the natural trigonometrical lines, and when solving a triangle it gives not only one side or one angle, but indicates at once all the unknown quantities sought for, and at the same time the instrument forms the triangle to be solved, thus giving a graphical approval to the data and operation, if both have been logical; but in case they are not correct the instrument does not make a triangle, hence indicating that the data are wrong. It will further be seen that all that is necessary to do to use the instrument is to make three lineal and two angle vernier readings and no other calculations except the simple one of the proportional scale or value given to the graduations on the rules, according to the magnitude of the side known, being in direct proportion to the extension of the same, the denominator of the ratio, or relationship used.

Having thus described my invention, I claim as new and desire to secure by Letters Patent—

1. A measuring instrument of the class described, comprising a frame having parallel lineal graduations, a quadrant fixed on the frame and having a double degree graduation and a pivotal rule having a linear graduation, a vernier on the said rule for reading fractions on the linear graduation of the rule, verniers on the rule for reading fractions of degrees on the double degree graduation, a protractor having double degree graduations, and adjustable on the frame to and from the quadrant, a pivoted scale-bar for the protractor and having linear graduations, a vernier slidable on the scale-bar for reading fractions of the linear graduation thereon, and verniers on the scale-bar for reading fractions on the said protractor graduations, as set forth.

2. A measuring instrument of the class described, comprising a rectangular frame having lineal scales on opposite sides, a quadrant fixed on the frame, a pivoted rule movable angularly on the quadrant, and having a lineal scale, means for adjustably securing the rule to the quadrant, a protractor, movable longitudinally on the frame, a pivoted scale-bar, movable angularly on the protractor and longitudinally on the frame therewith, said scale-bar and said rule being disposed to lie in mutually-intersecting planes and each movable angularly in either direction on and independently of the other, and said protractor having means, coacting with the lineal scale on the frame, to indicate the distance between the pivoted portions of the rule and scale-bar and means for adjustably securing the scale-bar to the protractor, substantially as described.

3. A measuring instrument of the class described, comprising a rectangular frame having lineal scales on opposite sides, a quadrant fixedly secured to the frame and having two graduations, a rule pivoted to the quadrant and adjustably secured thereto, said rule being provided with two fixed verniers and an adjustable vernier, a protractor slidably mounted on the frame and provided with two graduations, and a scale-bar pivoted to the protractor and adjustably secured thereto, said scale-bar being provided with two fixed verniers and an adjustable vernier, as set forth.

In testimony whereof I have signed my name to this specification in the presence of two subscribing witnesses.

TOMÁS FREGOSO.

Witnesses:
DAVIS RICHARDSON,
FRANK M. CROCKER.